Aug. 30, 1966    H. G. BAILEY ETAL    3,270,107
METHOD FOR REMOVING ELASTOMERIC STOCK FROM
THE WORK ROLL OF A MILL OR THE LIKE
Original Filed June 29, 1962    9 Sheets-Sheet 1

INVENTORS
HAROLD G. BAILEY &
ANDREW HALE
BY
Hamilton & Cook
ATTORNEYS

INVENTORS
HAROLD G. BAILEY &
ANDREW HALE
BY Hamilton & Cook
ATTORNEYS

FIG. 21

# United States Patent Office 3,270,107
Patented August 30, 1966

3,270,107
METHOD FOR REMOVING ELASTOMERIC STOCK FROM THE WORK ROLL OF A MILL OR THE LIKE
Harold G. Bailey and Andrew Hale, Akron, Ohio, assignors, by mesne assignments, to The Akron Standard Mold Company, Akron, Ohio, a corporation of Ohio
Original application June 29, 1962, Ser. No. 206,298, now Patent No. 3,221,364, dated Dec. 7, 1965. Divided and this application May 3, 1965, Ser. No. 459,977
5 Claims. (Cl. 264—147)

This application is a divisional application of our prior copending application, Serial No. 206,298, filed June 29, 1962, which issued as U.S. Patent No. 3,221,364 on December 7, 1965.

The present invention relates generally to a method for cutting elastomeric or plastic or rubber stock. More particularly, the present invention relates to a method for cutting off ribbons or strips of plastic stock from the discharge end of a mill, calender or the like. Specifically, the present invention relates to a method for cutting off ribbons of stock automatically and at selected widths.

Although the present invention is adaptable to various applications where it is desired to cut ribbons in preselected or variable widths, as where the stock is to be removed from a mill or calender, the invention will be described in its entirety in conjunction with a mill. Such a disclosure will completely teach the concept and adaptability of the invention.

Single stage mills are now extensively used to work plastic materials both to convert the granular, flake or pellet form into sheets and/or to intermix the constituent components completely. In the rubber industry, for example, a batch of rubber is compounded in a Banbury type mixer or pellets of the various ingredients are mixed together in the batches fed directly into an improved single stage mill in which the material is subjected to a succession of milling operations to break it down, disperse the compounding ingredients and plasticize the rubber. These successive milling operations are accomplished by cutting successive strips of the mill stock as it forms in sheets on the work roll and turning them back on themselves in rolling convolutions which are directed into the bank of stock at the bite. By thus repeatedly subdividing the stock and progressively advancing it along the mill, it is worked by repeated passages through the bite until it is delivered at the discharge end of the mill roll thoroughly milled. It is then cut off and removed from the work roll in a continuous strip.

The amount of stock in the mill is preferably replenished and kept substantially constant so that there will be an unbroken ribbon of stock removed from the mill so long as it is in operation.

Although the example described is the application of such a mill to the rubber industry, artificial resins and other synthetic plastic materials are milled in substantially the same manner, and the present invention is as readily applicable thereto.

Prior known take-off mechanisms for removing the continuous milled strip or ribbon of stock utilized standard take-off knives positioned against the work roll, which were displaced from each other a predetermined distance corresponding to the desired width of the ribbon sought to be produced. The leading edge of the ribbon was then either manually removed and guided onto the lead away conveyor or removed by a pinch or take-off roll placed at a distance from the work roll less than the thickness of the stock. Such a take-off mechanism is disclosed in the U.S. patent to Hale and Conley, No. 2,962,753.

These prior art take-off methods could not be effected if the mill rolls were revolved more than about 110 r.p.m., and furthermore, the width of the take-off ribbon could not be varied without interrupting the continuous flow.

It is, therefore, an object of the present invention to provide a method of removing an elastomeric ribbon from a work roll by which the width of the ribbon being removed can be selectively varied without interrupting the continuity of removal.

It is a further object of the present invention to provide a method, as above, for removal of stock from a mill effective both while the mill is operated at below normal, normal, or speeds several times those at which a mill normally operates.

It is a still further object of the present invention to provide a method, as above, by which the width of the ribbon being removed can be varied while maintaining the center line thereof fixed with respect to a point exteriorly of the machine upon which the method is being performed.

It is a still further object of the present invention to provide a method, as above, for variably controlling the width of the ribbon being removed in order to wind the ribbon to a predetermined profile on the winding mechanism.

It is a still further object of the present invention to provide a method, as above, for starting and continuously stripping a ribbon of milled stock from the work roll of a mill.

It is a still further object of the present invention to provide a method, as above, which eliminates the danger of having the mill operator stationed at the rolls.

These and other objects which will become apparent from the following specification are accomplished by means hereinafter described and claimed.

One preferred embodiment is shown by way of example in the accompanying drawings and described in detail without attempting to show all the various forms and modifications in which the invention might be embodied; the invention being measured by the appended claims and not by the details of the specification.

In general, a take-off mechanism according to the present invention is comprised of three major components: A cutting assembly, a kick-off means, and a conveyor assembly.

The cutting assembly comprises specially shaped stripping and grooving knives. The grooving knife forms a rabbet or furrow in the stock at the take off point on the work roll. When no stock is being removed from the working roll of an operating mill, the cutting edge of the stripping knife is positioned within the furrow formed by the grooving knife free of the stock. The ribbon is started by progressively incising the outer corner of the furrow in the stock on the work roll with the cutting edge of the specially constructed stripping knife causing the ribbon to be thrown outwardly of the stock roll toward and onto the conveyor assembly which leads the ribbon away from the mill. Controlled power means then continues to move the stripping knife along the work roll from the furrow until the desired width of ribbon is formed. In a modified version of the present invention both the grooving and stripping knives are moved away from each other. This modification is particularly suitable when it is desirable to remove wide ribbons from the mill or when it is necessary or desirable continuously to control or vary the width of the ribbon while maintaining the center line of the ribbon fixed with respect to a point exteriorly of the roll. This is particularly desirable if the controlled width of the ribbon of stock is being wound to a preselected profile on a winding mechanism—as where the ribbon is being wound directly onto a tire building machine or retread machine as it comes from the mill.

The grooving knife has a comparatively wide shank and is beveled on one or both sides to provide a cutting edge, the plane of which is applied at right angles to the work roll surface. The grooving knife is placed such that the width of the shank contributes to the formation of the above-mentioned furrow in the stock on the work roll. By comparison to the grooving knife, the stripping knife is of relatively narrow shank; has a cutting edge or blade which is angularly inclined to the work roll; and, preferably terminates in a foot or throwout flange the edge of which is adapted to lie tangentially to the work roll and angularly with respect to the rotational axis thereof.

The kick-off means comprises a roller positioned in close proximity to, but at a greater distance from the work roll than the thickness of the stock being milled, and is driven in a direction opposite to the direction of rotation of the work roll.

Figure 1:
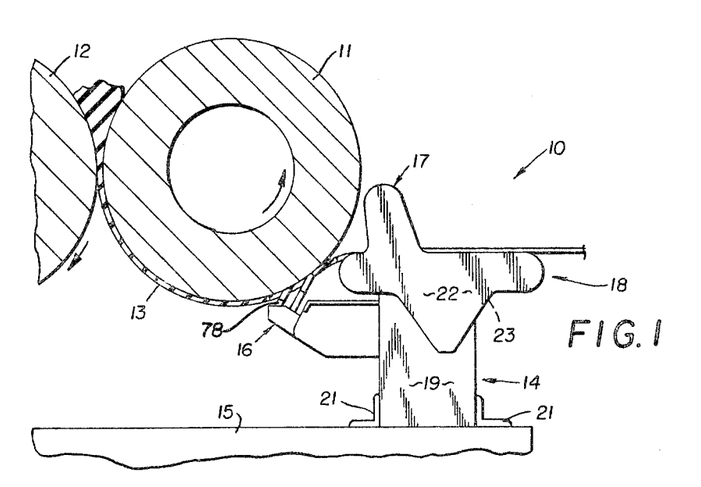
FIG. 1 is a side elevation of a take-off mechanism according to the present invention in operative position against the work roll of a mill.

Referring to FIG. 1 of the drawings, the improved take-off mechanism, indicated generally by the numeral 10, is shown in one of its possible environments mounted in operative position against the work roll 11 of a horizontal continuous mill. The work roll 11 and feed roll 12 of the mill are mounted in a suitable framework, not shown, and are adjustable with respect to one another in order to vary the width of the bite between the rolls which controls the thickness of the stock 13. As is well known to the prior art, the two rolls 11 and 12 are preferably cored for the circulation of a heating or cooling medium.

Coring of the rolls is especially important for mills which are supplied with a take-off mechanism according to the present invention because such mills can be operated at several times the speed of the mill provided with prior art take-off mechanisms.

Intensive working of any plastic or elastomeric material on a mill will raise the temperature of the material by the forces working it, and it has been found that particular plastic materials have a particular temperature range in which they are most effectively and efficiently milled. The high speed milling generally produces an excessive amount of heat which may be overcome by circulating a coolant through the rolls.

The take-off mechanism 10 is mounted on a frame 14 which can rest upon the floor 15 in front of the work roll 11 or the frame 14 can be demountably carried on the frame of the mill. The demountable feature is desirable so that the mechanism 10 can be removed for accessibility to the mill, as for example, to facilitate maintenance on the mill. Moreover, the frame can be mounted on casters or wheels on which to make it easily removable.

The main frame 14 supports the cutting assembly 16, the kick-off means 17, and the conveyor assembly 18.

Kick-off means and conveyor assembly

Figures 2, 5:
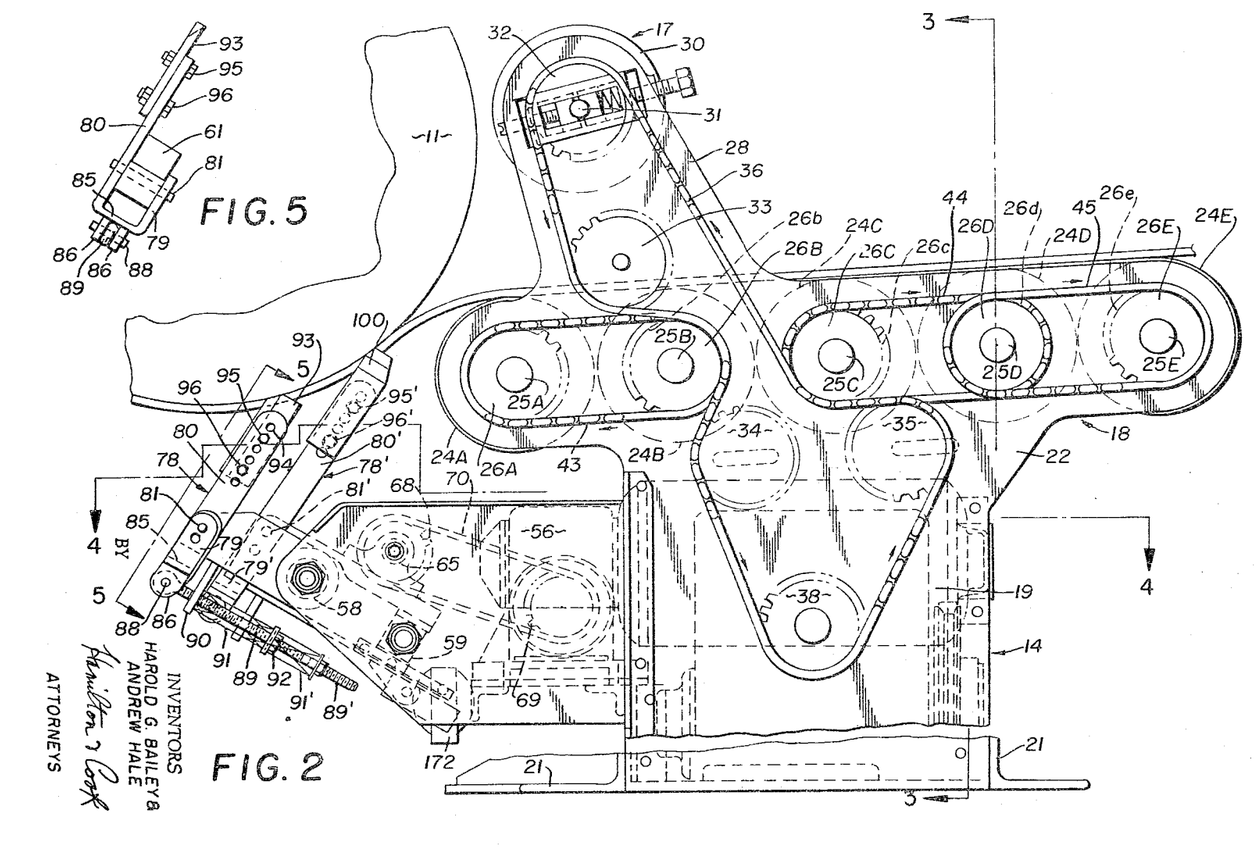
FIG. 2 is an enlarged view similar to FIG. 1.
FIG. 5 is an end elevation of a knife carrying arm with a grooving knife as used in the subject take-off mechanism, taken substantially on line 5—5 of FIG. 2.

The side plates 19 and 20 of the frame 14 extend upwardly from the base 21. At the upper extremity of the side plates 19 and 20 are attached the respective conveyor brackets 22 and 23. A plurality of rollers 24, as for example, the five 24A through 24E depicted in FIG. 2, are arranged in substantially horizontal alignment and journaled for rotation in brackets 22 and 23. The shafts 25A through 25E of each roller 24A through 24E, respectively, journaled in bracket 22, extend therethrough, and at least one sprocket 26 is non-rotatably keyed to each shaft. The various sprockets are designated as 26A through 26E corresponding to the rollers 24A through 24E, respectively, with upper case letters indicating one sprocket and lower case letters indicating a second sprocket mounted on the same shaft, either on the same or opposite side of the respective roller.

Brackets 22 and 23 are also provided with upstanding arms 28 and 29, respectively, between which is journaled a kick-off roller 30. The shaft 31 carrying roller 30 is preferably specially journaled (for a reason more fully hereinafter explained) in the arms 28 and 29 of brackets 22 and 23, and also extends beyond arm 28 and has a sprocket 32 non-rotatably keyed thereon.

The heretofore mentioned sprockets and their chain drive are best seen in FIG. 2. An idler sprocket 33 is positioned above and to the left of sprocket 26B, and between and in the same plane with the sprocket 26B and sprocket 32. A similar idler sprocket 34 is mounted on bracket 22 below and in the same plane as sprocket 26B, and a third and similar idler sprocket 35 is mounted below and to the right of and in the same plane as sprocket 26C.

Figure 3:
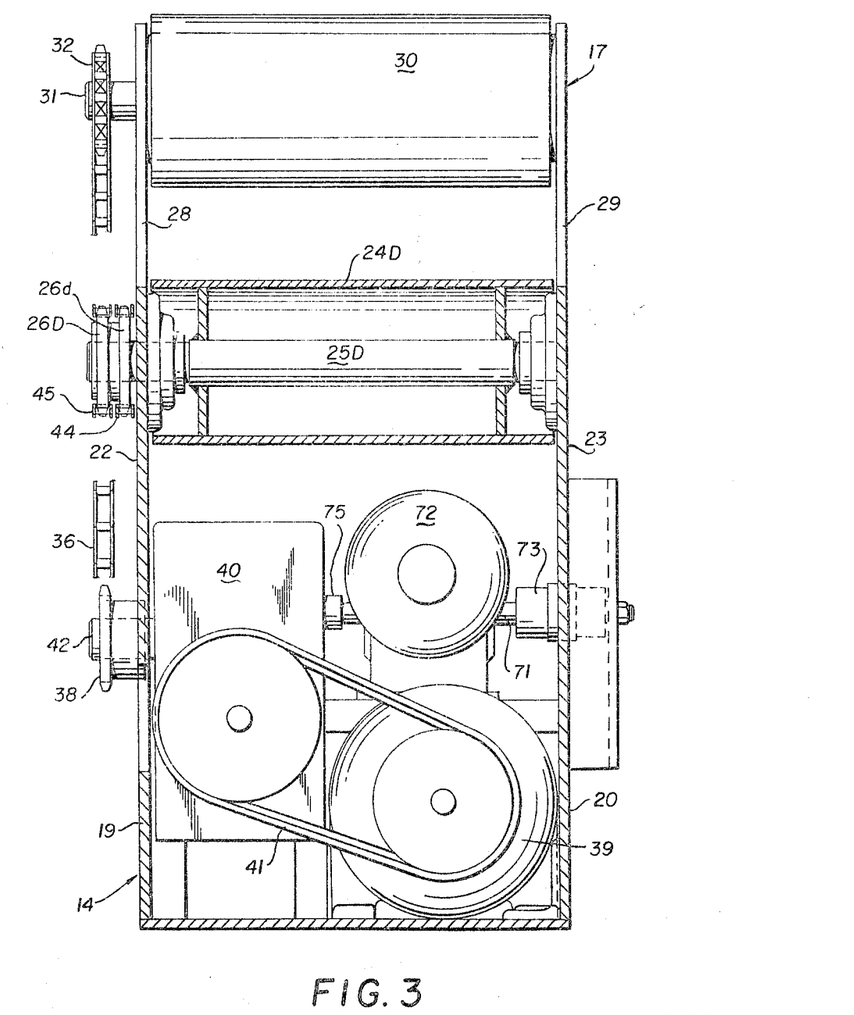
FIG. 3 is a cross section taken substantially on line 3—3 of FIG. 2.

A chain 36, driven by driving sprocket 38, travels in the direction of the arrows and is reeved directly to drive idler sprocket 35 counterclockwise, sprocket 26C clockwise, sprocket 32 counterclockwise, idler sprocket 33 counterclockwise, sprocket 26B clockwise, and idler sprocket 34 counterclockwise. The driving sprocket 38 is powered by a motor 39 through a gear reducer 40, both of which are housed within frame 14 (FIG. 3). The gear reducer 40 is shown to be operated through the V-belt drive 41 from motor 39 and the output shaft 42 of the gear reducer 40 has the driving sprocket 38 non-rotatably keyed thereon.

The chain 36, therefore, directly turns the rollers 24B and 24C. Roller 24A is rotated by a slave drive chain 43 powered by sprocket 26b non-rotatably keyed to shaft 25B with sprocket 26B to turn sprocket 26A, non-rotatably keyed on roller shaft 25A.

Rollers 24D and 24E are similarly driven by a two-stage slave drive. A chain 44 powers sprocket 26d, non-rotatably keyed on shaft 25D from sprocket 26c non-rotatably keyed to shaft 25C with sprocket 26C. The second stage drive chain 45 in turn drives sprocket 26E non-rotatably keyed to shaft 25E by sprocket 26D non-rotatably keyed to shaft 25D with sprocket 26d. The chains of the drive system thus defined travel in the direction of the arrows shown, to rotate all the rollers 24A through 24E of the conveyor assembly 18 in a clockwise direction as viewed from FIG. 2. A conveyor belt, not shown, may be used in lieu of or in conjunction with the rollers of the conveyor assembly 18 described.

The roller 30, however, rotates counterclockwise, as seen in FIG. 2. This roller is part of the kick-off means 17 and, though mounted on the arms 28 and 29 of brackets 22 and 23, does not constitute a part of the conveyor assembly 18. As will be hereinafter more fully described with respect to the operation of the take-off mechanism, the roller 30 must rotate counter the rotation of work roll 11, preferably at a surface speed slightly faster than the speed of the mill roll 11, and be positioned at a distance from the work roll 11 slightly greater than the thickness of the stock being worked. Thus, the roller 30 should be adjustable with respect to its displacement from the work roll 11. Furthermore, should a wad of stock inadvertently position itself between the work roll 11 and the kick-off roll 30, it is desirable that the wad be automatically cleared. Both the requirements can be effected by journaling shaft 31 in spring-biased journal block 48 slidably carried in arms 28 and 29. The journal block 48 is slidably retained in slot 49 and a working compression spring 50 engages the work roll side of the journal block 48 and an adjustable stop or set screw 51 engages the opposite side of the block 48. Set screw 52, mounted on arm 28, is adapted to vary the pre-compression of work spring 50 51, thus to position the kick-off roller 30 at a selected distance from the work roll 11. The control spring 51 would also allow the roller 30 to move away from the work roll 11 to clear itself in the event that a wad of stock should get between the kick-off roll 30 and the work roll 11.

*Cutting assembly*

The frame 55 of the cutting assembly 16 (FIG. 4) is fastened to the main frame 14 so that the side plates 56 and 57 extend toward and partially beneath the mill work roll 11. Two slide bars 58 and 59 extend between the side plates and may be secured thereto by nut 60. One of the said slide bars is preferably round and the other square. As shown, the outermost bar 58 is round and the innermost bar 59 is square. Each of the two knife blocks 61 and 62 are slidably mounted on both bars 58 and 59.

Figure 4:
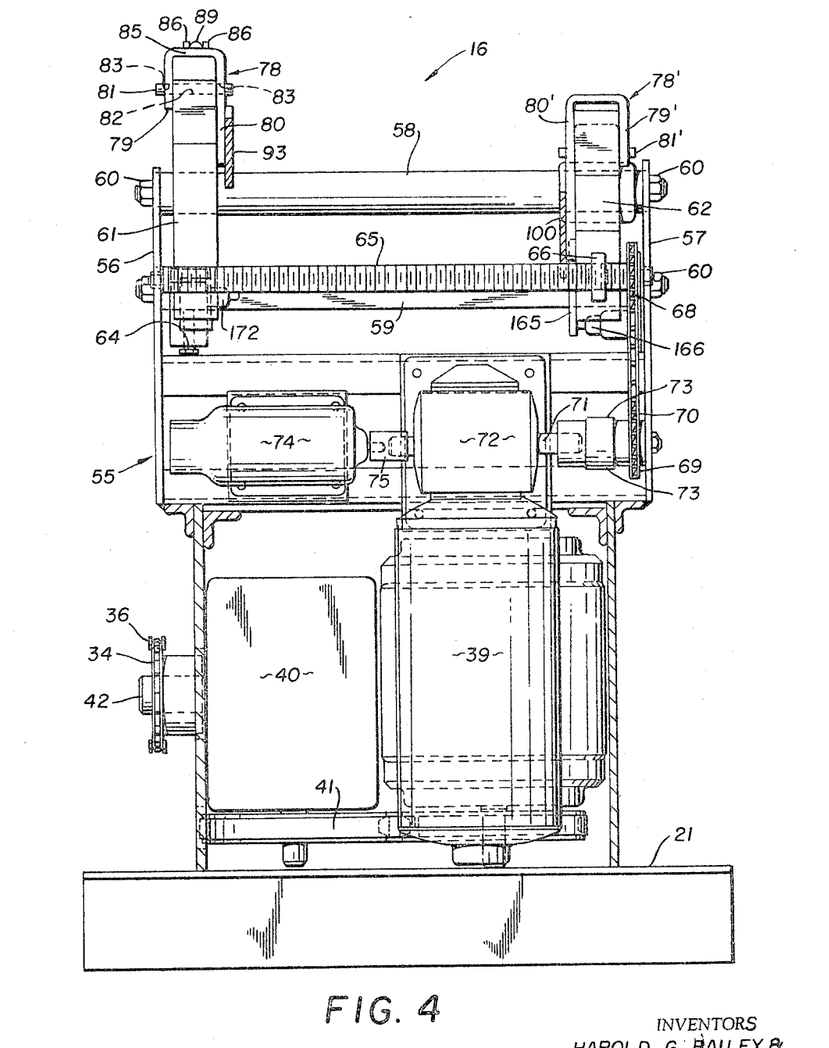
FIG. 4 is a cross section taken substantially on line 4—4 of FIG. 3.

In the embodiment depicted in FIG. 4, the knife block 61 is manually adjustable along slide bars 58 and 59 and can be locked at the desired position therealong, as, for example, by a set screw 64 in block 61 which can be tightened to engage the slide bar 59.

The position of the knife block 62, also slidable on bars 58 and 59, is controlled by a threaded drive shaft 75 65 which turns a traveling nut 66 secured to block 62. Drive shaft 65 parallels the slide bars 58 and 59 and is journaled in side plates 56 and 57. The sprocket 68 is non-rotatably keyed to drive shaft 65 and is connected to a driving sprocket 69 by a drive chain 70. Sprocket 69 is turned by the shaft 71 of motor 72 through a coupling 73 to which it is non-rotatably joined.

Limit switch 172 mounted on slide block 61 is provided to stop motor 72 when slide block 62 reaches the zero width position and limit switch 166 is provided to stop the motor 72 at the upper limit of travel, as will be more fully hereinafter described.

A Selsyn generator 74 is also powered by motor 72 and may be attached to the opposite end of motor shaft 71 by coupling 75. The Selsyn generator 74 is used to provide a positive incremental control to the take-off mechanism, as hereinafter more fully described. Of course, other controls, as, for example, a null system could be applied with equal facility.

The motor 72 must be provided with any of a number of braking means to control the exact rotation thereof. For example, the shaft 71 may be provided with a solenoid operated shoe brake, or magnetic spring loaded brake arranged to be automatically applied whenever the motor current is cut off to stop the motor. If motor 72 is of the three phase squirrel cage variety, it may be so connected as to be dynamically braked—i.e., a D.C. voltage on the order of one quarter that of the A.C. voltage may be applied across one phase of the winding for a given interval to instantaneously brake the motor. If motor 72 is a D.C. motor, it may be braked by the regenerative energy of the armature current being dispelled through one or more of a series of resistors. Such motors are available as a standard item of commerce with any one of these braking means built in. The breaking means, therefore, is not shown separately on the drawings even though a braking means is requisite to the maintenance of close control of the take-off mechanism.

Knife carrying arms are mounted on the knife blocks 61 and 62. Carrying arm 78 is pivotally mounted on knife block 61, and as best shown in FIGS. 4 and 5, the carrying arm 78 is of a generally hook shape with the two fingers 79 and 80 straddling the block 61. A pivot pin 81 extends through a bore 82 in block 61 and engages a registered bore 83 in each of the fingers 79 and 80, so that the arms 78 can pivot thereon. One or more additional registered bores 84 are provided on fingers 79 and 80 to provide an adjustment of the arms 78 with respect to the block 61. The base 85 of the hook-shaped arm 78 is provided with two outwardly directed flanges 86 with a pin 88 therebetween to pivotally mount the looped end of a toggle bolt 89. The other or straight end of toggle bolt 89 passes through a flange 90 on block 61 and carries a compression spring 91 therearound between the flange 90 and the nut 92 screwed onto the straight end of the toggle bolt 89. This spring 91 biases the carrying arm 78 so that the grooving knife 93 carried on the longer of the two fingers 80 of the hook shaped arm 78 is urged toward the work roll 11. The longer leg 80 is provided with a plurality of bores 94 for adjustably mounting the grooving knife 93 longitudinally of itself with respect to the leg 80, as by the two fastening bolts 95 and 96.

A similar hook shaped carrying arm 78' is pivotally mounted on block 62 by a pivot pin 81' and has a toggle bolt 89' with its coacting spring 91' to bias the carrying arm 78' on its pivot 81'. The longer finger 80' of the two fingers 79' and 80' of the carrying arm 78' adjustably mounts a stripping knife 100, as by bolts 95' and 96', which is similarly urged against the work roll 11 by the biasing action of spring 91'.

*Knives*

Figure 6:
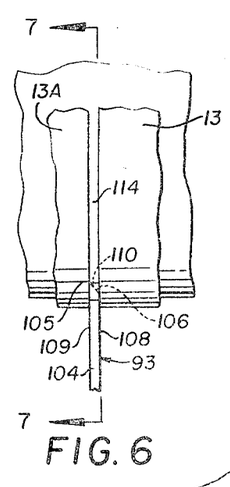
FIG. 6 is an elevation of the face of the work roll of a mill showing the grooving knife in contact therewith.
Figure 7:
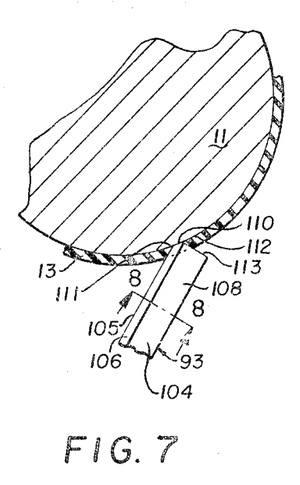
FIG. 7 is a cross section taken substantially on line 7—7 of FIG. 6, showing the grooving knife in side elevation.
Figure 8:
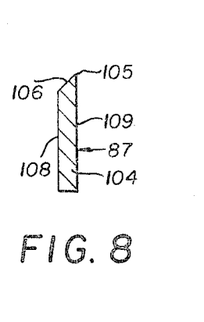
FIG. 8 is a view taken substantially on line 8—8 of FIG. 7 showing the grooving knife in cross section.

The grooving knife 93, as best shown in FIGS. 7–8, has a relatively wide shank 104 which is sharpened to a knife or cutting edge 105 along one side, either as by the single beveled surface 106 extending from the face 108 of the shank 104, as shown, or by two beveled surfaces extending one from each face 108 and 109 to form a knife or cutting edge. A triangularly shaped furrowing face 110, with its apex 111 at the cutting edge 105 and its base 112 at the intersection of the furrowing face and the outer end 113 of the shank of the knife, is biased against the surface of the work roll 11 by the arrangement of the carrying arm 78, discussed above. So placed, the grooving knife 93 cuts and separates the stock 13 on the work roll 11 to form a groove or furrow 114 in the stock 13, as best shown in FIG. 6. It has also been found that less spring pressure is required to hold the grooving knife 93 against the work roll if the furrowing face 110 is ground away to provide line contact with the work roll. That is, the furrow in the stock would be formed by a knife edge contact with the roll—that edge extending from the apex 111 along the intersection of furrowing face 110 and beveled surface 106 terminating at the outer end 113 of the knife. The grooving knife 93 is set in from the edge of the stock on the work roll, thus forming the excess margin of stock 13A in order to assure that a full ribbon of stock will be removed from the mill.

Stripping knife 100, as best shown in FIGS. 9–17, has a blade portion 15 extending angularly outwardly from the shank 116. A throwout foot 118 is preferably provided at the outer end of the blade. The foot 118 similarly extends angularly outwardly from the blade 115. The blade 115 and the foot 118 have beveled surfaces 119 and 120, respectively, extending from the lag face 121 to intersect the lead face 122 whereby knife edges 123 and 124 are formed on the blade and foot portions 115 and 118, respectively. The projected profile of knife edge 124 is recedingly slanted with respect to knife edge 123. The angle at which the profile of edge 124 is slanted with respect to the edge 123 can be varied to select the angle projected to and measured in a plane perpendicular to the rotational axis of the work roll 11, at which the knife edge 123 meets the roll. This perpendicularly measured angle will be hereinafter referred to as the knife edge intersection angle and, to be distinguished from the angle, measured with respect to the rotational axis of the work roll 11, at which the plane of the blade portion 115 meets the roll. This latter angle will hereinafter be referred to as the blade intersection angle.

Figures 9, 10, 11:
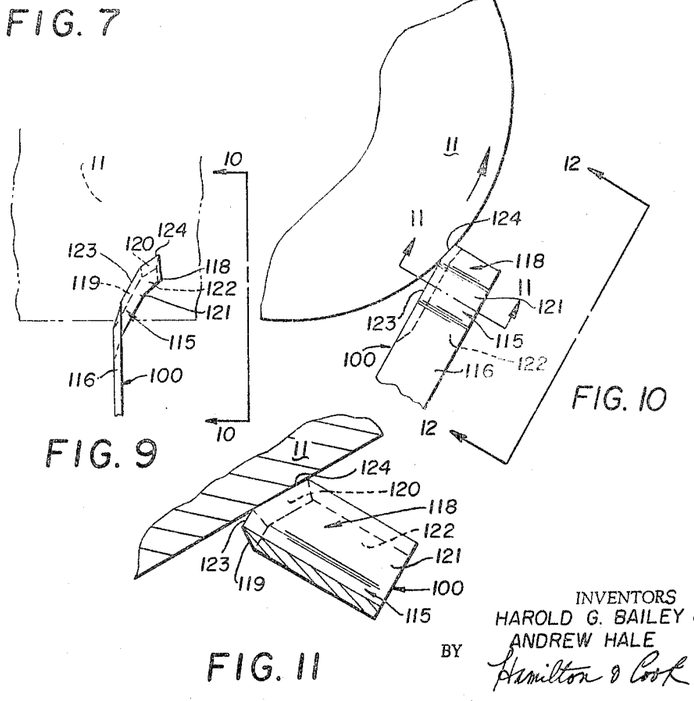
FIG. 9 is a view showing the stripping knife in operative position against the work roll as taken from inside the work roll looking out.
FIG. 10 is a cross section through the work roll taken substantially on line 10—10 of FIG. 9, showing the stripping knife in side elevation.
FIG. 11 is a cross section taken substantially on line 11—11 of FIG. 10.

As can best be seen in FIG. 9, the knife edge 124 of the throwout foot 118 contacts the surface of work roll 11 at an angle to the rotational axis of the roll—i.e., the knife edge 124 of the throwout foot 118 trails with respect to the direction in which the work roll is rotating.

The blade intersection angle permits the blade 115 to ride in the furrow 114 spread by the grooving knife 93 without the blade portion 115 contacting the stock 13 on either side of the furrow. In the particular embodiment of the take-off mechanism 16 disclosed, the carrying arms 78 and 90 on the knife blocks 61 and 62 are positioned, as best shown in FIG. 4, to permit the stripping knife 100 to be so positioned in the furrow 114 formed behind, that is, in circumferential alignment with, the grooving knife 93 as the work roll 11 rotates.

Figure 12:
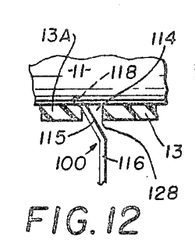
FIG. 12 is an oblique elevation as though taken substantially along line 12—12 of FIG. 10 showing the stripping knife positioned within the furrow formed by the grooving knife prior to removal of a ribbon of stock.

In FIG. 12 is can be seen that the foot portion 118 of the stripping knife 100 may extend slightly beneath the excess stock strip 13A. The trailing disposition of the foot knife edge 124 assists in permitting that portion of the stripping knife to lie beneath the stock 13A while no stock is being removed from the work roll 11 without inadvertently throwing or cutting the strip 13A therefrom.

Figures 13, 14:
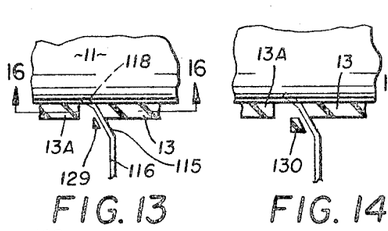
FIG. 13 is a view similar to FIG. 12 showing the initial cut of the stripping knife as it is moved laterally along the work roll, out of the grooving furrow formed by the grooving knife into the stock.
FIG. 14 is a view similar to FIG. 12 showing the progressive movement of the stripping knife from the position of FIG. 13.
Figure 15:
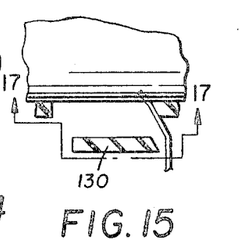
FIG. 15 is a view similar to FIG. 12 showing the stripping knife removing a ribbon of stock from the work roll.
Figure 16:
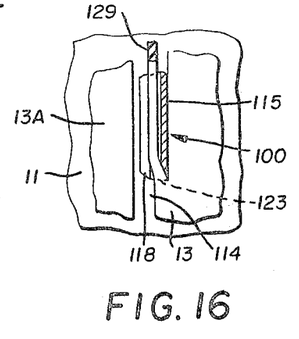
FIG. 16 is a frontal view showing the initial cut of the stripping knife taken substantially on line 16—16 of FIG. 13.
Figure 17:
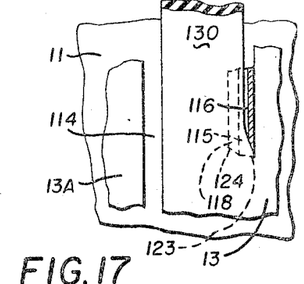
FIG. 17 is a view similar to FIG. 16, taken substantially on line 17—17 of FIG. 15.

When it is desired to remove a ribbon, the stripping knife 100 is moved laterally along the work roll 11 away from the grooving knife. Because of the blade intersection angle, the cutting edge 123 of the blade portion 115 incises into the radially outer corner 128 of stock 13 at the side of the furrow 114, separating a lead thread 129 of the ribbon to be removed. Continued traversing movement of the stripping knife 100 along the work roll 11, as from the FIG. 13 to the FIG. 14 representation, allows the cutting edge 123 of the blade portion 115 to incise the stock 13 from the radially outer surface of the stock to the surface of the work roll 11 to cut off a ribbon 130.

It has been found that by having the blade intersection angle thus less than perpendicular with respect to the work roll, the ribbon 130 is always completely severed from the stock 13. This completely clean severance of the ribbon has been difficult to attain in the prior art constructions where the knives were oriented perpendicularly to the surface of the work roll. Of course, this complete severance of the ribbon from the stock is assisted by the knife edge 124 on the foot portion 118 when extremely tough material is being cut by the take-off mechanism 16.

To summarize, the blade intersection angle permits the cutting edge 123 to lie in a plane parallel to the axis of rotation of work roll 11 at an angle of less than 90° with respect to a line parallel to said axis and located in said plane.

As the stripping knife thus cuts the stock, the throwout foot 118 rides beneath the ribbon 130 and tends to throw it away from the work roll 11.

In some situations the throwout foot 118 on the stripping knife 100 may not be sufficient to completely disengage the ribbon 130 from the work roll 11. This is especially true when an extremely sticky stock is being worked and it tends to stick to or follow the work roll. Even in this situation, however, the initial lead thread 129, because of the configuration of the stripping knife 100, will be completely severed from the stock 13 and thrown somewhat outwardly therefrom. The roller 30 of the kick-off assembly 17, which is positioned at a distance from the work roll 11 slightly greater than the thickness of the stock from which the ribbon is being cut and rotating in a direction counter that of the work roll, effectively directs even the most stubborn of materials onto the conveyor assembly. Further, it has been found that the best results are attained when the surface speed of the roller 30 is slightly greater than that of the work roll 11.

The stripping knife 100 may be controllably moved to a fixed position where it will maintain the desired width of the ribbon 130 to be removed or it may be controllably moved to vary the width of the ribbon being removed.

*Width controls*

In the preferred embodiment of the invention, the stripping knife 100 is controllably moved by a Selsyn motor-generator setup. As was previously mentioned, any of a number of other controls, such as a null balance control, could be effectively used.

Figure 18:
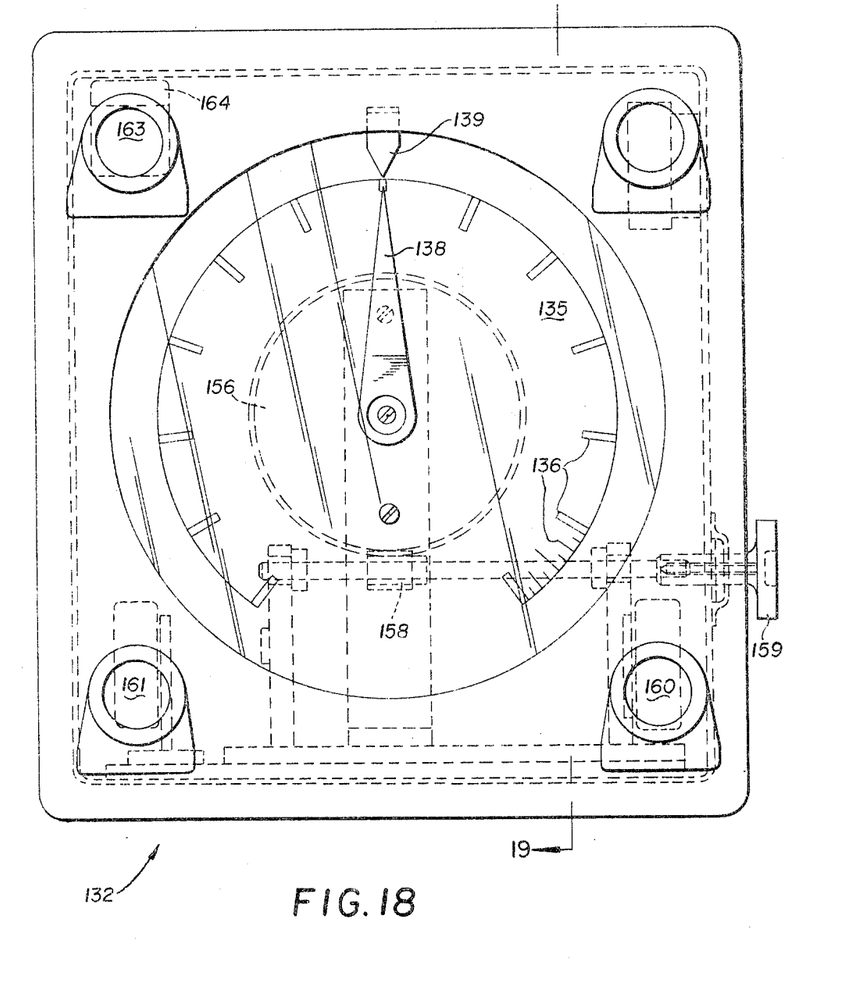
FIG. 18 is a front elevation of the Selsyn motor control used to regulate the width of the ribbon removed by the take-off mechanism.
Figure 19:
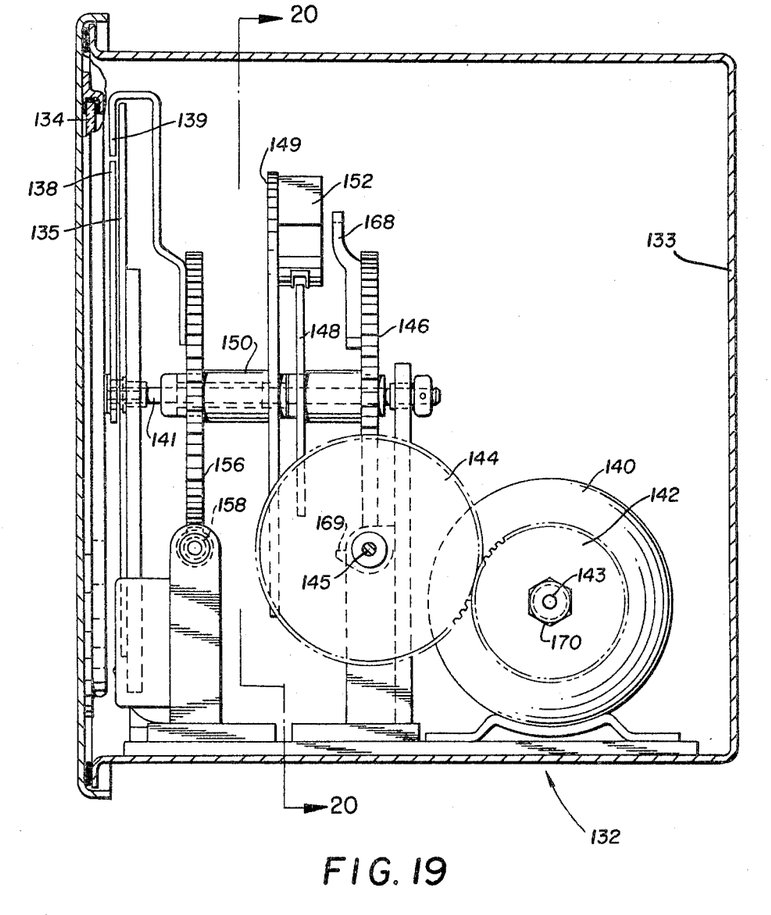
FIG. 19 is a cross section taken substantially on line 19—19 of FIG. 18.
Figure 20:
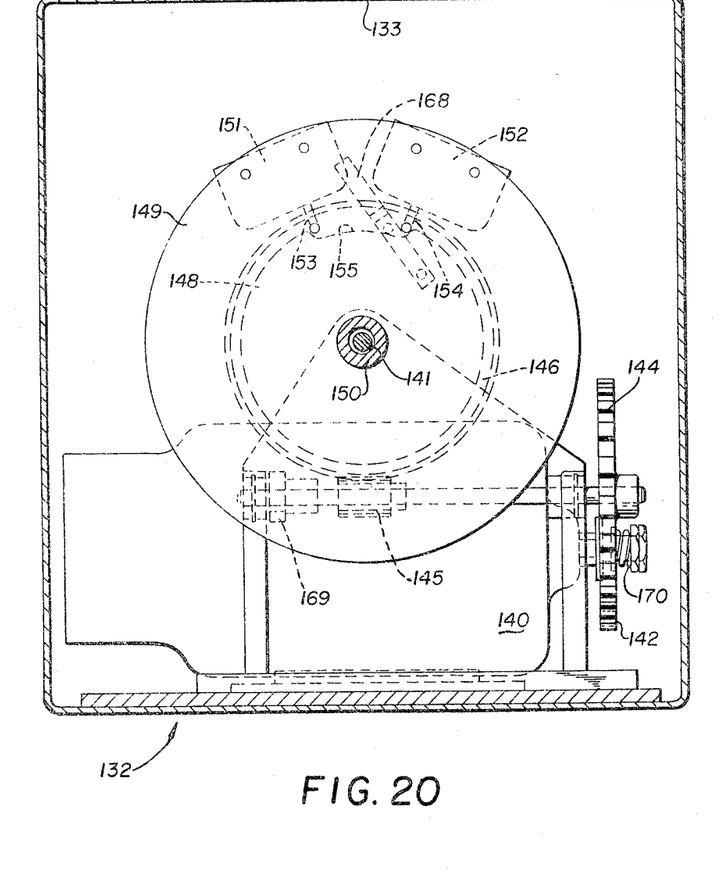
FIG. 20 is a cross section taken substantially on line 20—20 of FIG. 19.

The Selsyn generator 74, best shown in FIG. 4, is electrically connected to the remote control unit, indicated generally by the numeral 132, as shown in FIGS. 18–20.

The remote control unit 132 is preferably contained within a dustproof housing 133 provided with a viewing glass 134 for permitting observation of a face 135 with an annularly marked measuring scale 136. Also visible through viewing glass 134 are two pointers 138 and 139 positioned to read along scale 136.

A Selsyn motor 140, electrically connected to Selsyn generator 74, is mounted interiorly of housing 133. The Selsyn motor 140 is operatively connected to control the movement of an indicating pointer 138 by the following gear train which rotates the shaft 141 upon which the indicating pointer 138 is non-rotatably mounted. A gear 142 is non-rotatably secured to the shaft 143 of motor 140 and meshes with a gear 144, non-rotatably secured to a worm 145 which is meshed with a worm gear 146 non-rotatably secured to the shaft 141. Thus any rotation of motor 140 is indicated by indicating pointer 138 of the scale 136. Because the motor 140 is operated by the current generated in generator 74, which is coupled to the motor 72, which also operates the threaded shaft 65 to move the stripping knife 100 along the work roll, the indicating pointer 138 indicates the position of the stripping knife 100, and it is merely a matter of calibration for the scale 136 to indicate the lateral distance moved by the stripping knife 100 along the work roll 11.

A cam plate 148 is also non-rotatably mounted on shaft 141 in proximity to a switch plate 149 secured to a sleeve 150 which is rotatably carried on shaft 141.

Two switches 151 and 152 are mounted on switch plate 149. The switch actuating levers 153 and 154, respectively, are spring loaded and engage the cam plate 148. When the actuating levers 153 and 154 are received at each end of the cam indentation 155 on the periphery of cam plate 148, as shown in FIG. 20, these switches are opened and any relative movement between the cam plate 148 and the switch plate 149 will close either one or the other of the switches 151 and 152.

The switches 151 and 152 are connected in circuit with the reversible gear head motor 72 that moves the stripping knife 100 in either direction along the work roll 11: Closing one switch moves the knife in one direction and closing the other switch moves the knife in the other direction. Moreover, the direction the knife is moved when either switch is closed is in that direction which turns the shaft 141 such that the actuating lever on the closed switch is returned to the cam indentation 155 where the switch will automatically open and stop the movement of the knife.

The indexing or setting pointer 139 is carried on a worm gear 156 which is non-rotatably mounted on sleeve 150 which carries the switch plate 149. The worm gear 156 meshes with a worm 158, one end of which carries a knob 159 positioned exteriorly of the housing 133. Thus, if it is desired to move the stripping knife in either direction by means of the remote control unit, the knob 159 is operated to move the setting pointer 139 the desired distance as read from the scale 136. One or the other of the switches 151 and 152 will thereby be closed, as described above, and the knife will move the desired distance until the switches are open. It is more convenient for the operator if the two pointers 138 and 139 are opposed, as shown in FIG. 18, when the switches are open.

It may also be desirable to provide the remote control unit 132 with a "stop strip" button 160 and a "start strip" button 161. These buttons 160 and 161 would be connected via suitable switches, relays and other electrical circuitry to serve the following functions. The stop strip button 160, when actuated, would automatically cause the stripping knife 100 to return to the furrow 114 formed by the grooving knife 93. The start button 161 is used to return the stripping knife 100 to the preset position from the zero or circumferentially aligned position. In other words, it starts the strip 130 from the mill by moving the stripping knife 100 from the zero position to the desired strip width, as indicated by the set pointer 139.

For ease of assembly, disassembly and changing positions of the take-off mechanism 16, as well as the remote control unit 132, all electrical connections therebetween are preferably of a plug and socket variety. It is thus readily apparent that the synchronism between the control position of the stripping knife 100 and the indicating pointer 138, or the grooving knife 93 and the "0" scale reading, could easily get out of phase because of disconnecting and reconnecting the width control.

The remote control unit 132 is, therefore, provided with an automatic resetting mechanism. Depressing the "reset zero" button 163 actuates a relay 164 which disconnects the electrical connection between the Selsyn generator 74 and the Selsyn motor 140; disconnects the switches 151 and 152; and, at the same time, switches on the motor 72 to move the stripping knife 100 to the most remote point of travel from grooving knife 93. This insures that the reading of the indicating pointer 138 will be less than the actual distance between the grooving knife 93 and the stripping knife 100. At this most remote point of travel, a switch trip 165 carried on knife block 62 actuates a limit switch 166 mounted on side plate 57 of the frame 55 of the cutting assembly 16 (FIG. 4). The actuation of limit switch 166 reconnects the Selsyn generator 74 to the Selsyn motor 140 and causes the stripping knife 100 to traverse the work roll 11 in a direction toward the position of the grooving knife 93. During the first portion of this return-traversing movement, the indicating pointer 138 travels with the stripping knife 100 but, because it reads less than the actual displacement of the stripping knife from the grooving knife at the beginning of the return-traversing movement, the indicating pointer 138 will read the zero index before the return traverse of the stripping knife is completed. When the indicating pointer 138 reaches the zero index, an arm 168 carried on worm gear 146 engages a rotating stop flange 169 nonrotatably mounted with pinion 145 to prevent continued rotation of the gear train operating indicating pointer 138. The spring-operated slip clutch 170 between the shaft 143 of Selsyn motor 140 and the sprocket 142 mounted thereon permits the Selsyn motor to continue to operate with the movement of the stripping knife after the indicating pointer 138 has zeroed. When the stripping knife 100 has returned to the position in circumferential alignment with the grooving knife 93—i.e., when the blade 115 of the stripping knife 100 is positioned within the furrow 114 formed by the grooving knife—a switch trip 165 carried on block 62 actuates a limit switch 172 mounted on the knife block 61. The tripping of switch 172 stops the return traversing movement of knife 100, with the stripping knife 100 and pointer 138 in synchronism and reconnects the switches 151 and 152 to the motor 72 for continued controlled operation of the knife by the remote control unit 132.

A similar control may also be used to regulate the position of both the grooving and stripping knives or, if desired, a demand programming or a predetermined programming may be effected.

Demand programming may be required, for example, where a given weight or amount of stock is required to be stored or stocked at an operation subsequent to the mill. The width of the stock can thus be constantly varied to effect this result.

Predetermined programming, for example, could be used to excellent advantage where the ribbon is to be wound on a winding mechanism in such widths as to produce a predetermined profile to the finished winding. Cooperatively movable knives are capable of producing a variable width ribbon having its center line fixed with respect to a point exteriorly of the take-off mechanism. A ribbon removed by such a device can be wound to a predetermined symmetrical profile. Separate, independently movable knives may also produce a symmetrically profiled winding but they are especially adaptable for producing non-symmetrical windings.

Figure 21:
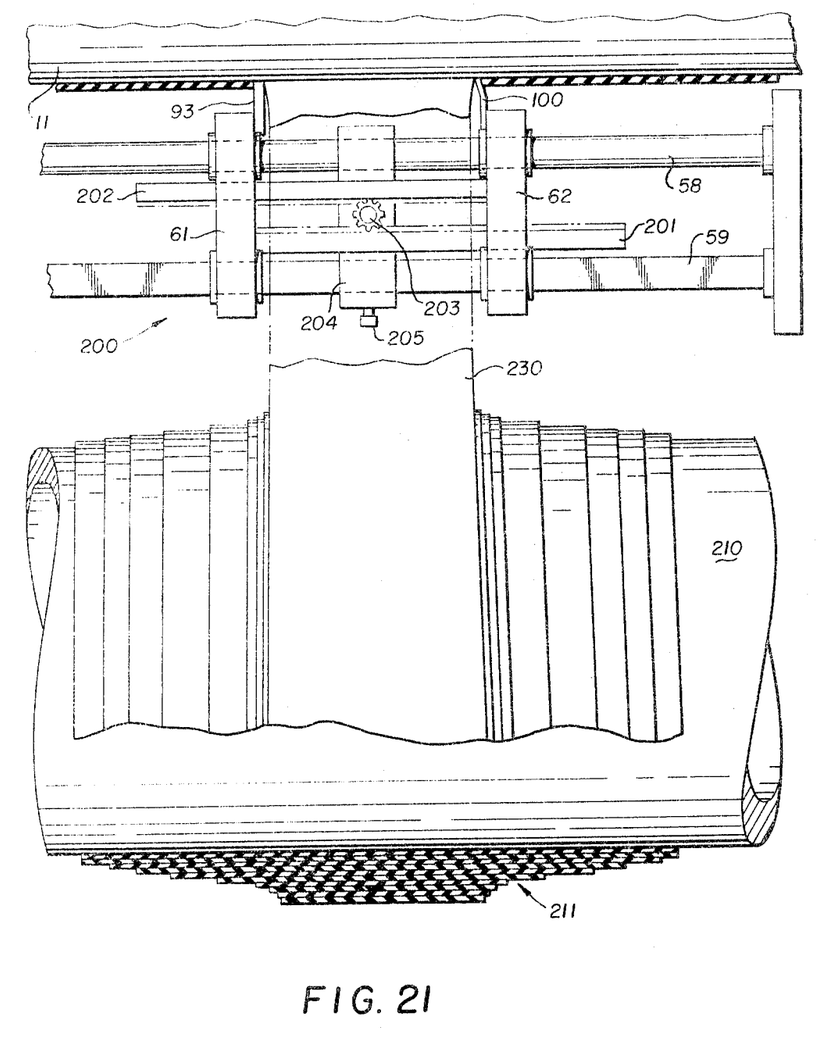
FIG. 21 is a view similar to FIG. 4 showing a modification of the take-off mechanism according to the present invention in which both the grooving and the stripping knives are controllably movable to vary the width of the ribbon being cut, and showing a typical application.

Another form of take-off mechanism, indicated generally by the numeral 200, adapted to move both the grooving and the stripping knives, is shown in FIG. 21.

In this embodiment the block 61 carrying grooving knife 93 and the block 62 carrying the stripping knife 100 are both also slidably carried on bars 58 and 59. Racks 201 and 202 are secured to blocks 61 and 62, respectively, and mesh with a common pinion 203 pivotally mounted in a centering housing 204 and connected to a drive motor, as, for example, a motor similar to motor 72 shown in FIG. 4, by suitable means not shown.

The centering housing 204 is preferably adjustably positionable along slide bars 58 and 59, as by set screw 205, in order to select the lateral position of the center line of the strip to be removed by take-off mechanism 200.

The stripping knife 100 will align circumferentially with grooving knife 93, exactly as heretofore described, when no strip is being removed from the work roll 11. By positioning the centering housing such that this alignment of knives 93 and 100 occurs at the desired center line location, subsequent separation of the knives will always remove a strip which has a center line fixed with respect to a point exteriorly of the take-off mechanism. This result is accomplished by cooperatively moving the two knives through the common pinion 203. In that way, the distance from the center line to one knife will always equal the distance from the center line to the second knife. Thus, the ribbon removed by this form of the take-off mechanism will always be symmetrical about a center line fixed with respect to a point exteriorly of the take-off mechanism.

In some applications of the present invention it may be desirable to produce a wide non-symmetrical ribbon. If such is desired, each rack 201 and 202 could be independently operated. That is, they would not be operated by a common pinion, but rather by a separate, or individual, pinion (not shown).

Nor do the two knife carrying blocks 61 and 62 need to be operated by racks and pinions. Each of the blocks could be operated by the threaded shaft or shafts, similar to shaft 65 shown in FIG. 4. Both blocks 61 and 62 could be mounted on the same shaft, which would have right hand threads on one portion for moving one block and left hand threads on the remainder of the shaft for moving the second block. This would produce a symmetrical ribbon similar to the embodiments of the take-off mechanism depicted in FIG. 21. Or, each block could be moved by an individual threaded shaft. These shafts could be rotated at identical rates and for identical periods to produce a symmetrical ribbon, or their rates and speeds could be varied to produce a non-symmetrical ribbon. Various other means of movement could be used.

By so controlling the traverse of the two knives, a strip 230 can be wound onto a winding mechanism 210 in controlled widths to produce a predetermined contour in the wound stock. As shown in FIG. 21, the layers can be built up of variable widths sufficient to produce a tire tread, the camelback, 211. Such an application is particularly suited both to the tire manufacturer and to the retreader. The prior art teaches manufacturing tire tread and camelback by extrusion processes. An improved final product can be obtained by winding successive thin strips directly from the work roll of a mill, because the material is of more uniform consistency. Moreover, the retread shop supplied with a mill having a take-off mechanism constructed according to the concept of the present invention need not stock various sizes of camelback, but can control the knives to "customize" the camelback to the particular tire.

The width of the stock comprising the successive layers wound to produce the desired profile on the wound stock can be controlled by an operator or programmed to be varied automatically and even be programmed to cut off the strip whe nthe desired weight has been wound onto the winding mechanism, as desired.

It is thus apparent that take-off mechanisms constructed in accordance with the concepts herein disclosed accomplish the objects of the invention.

What is claimed is:
1. A method of removing a ribbon of elastomeric stock from a rotating work roll comprising the steps of, forming a furrow through the stock on said rotating work roll, incising a lead thread of stock from the side of said furrow, and progressively incising said stock laterally along said rotating work roll to form a ribbon.

2. A method of removing a ribbon of elastomeric stock from a rotating work roll comprising the steps of, forming a furrow through the stock on said rotating work roll, incising a lead thread of stock from the side of said furrow, progressively incising said stock laterally along said rotating work roll to form a ribbon, and regulating the distance between the furrow and the incision of said stock to control the width of the ribbon removed thereby.

3. A method of removing a ribbon of elastomeric stock from a rotating work roll comprising the steps of, forming a furrow through the stock on said rotating work roll, positioning a knife means having a cutting edge in said furrow and against said work roll such that the cutting edge of said knife means lies in a plane parallel to the axis of rotation of said work roll and is inclined at an angle of less than 90° with respect to a line parallel to said axis and located in said plane, incising a lead thread of stock from the side of said furrow at the radially outer surface of said stock with said cutting edge by lateral separation of said furrow and knife means, further separating said furrow and knife means to incise the stock from the radially outer surface of said stock to the surface of said work roll to form a ribbon, and regulating the distance between the furrow and the incision of said stock to control the width of the ribbon removed thereby.

4. A method of removing a ribbon of elastomeric stock from a rotating work roll comprising the steps of, forming a furrow through the stock on said rotating work roll, positioning a knife means having a cutting edge in said furrow and against said work roll such that the cutting edge of said knife means lies in a plane parallel to the axis of rotation of said work roll and is inclined at an angle of less than 90° with respect to a line parallel to said axis and located in said plane, incising a lead thread of stock from the side of said furrow at the radially outer surface of said stock with said cutting edge by lateral separation of said furrow and knife means, directing said lead thread away from said work roll, further separating said furrow and knife means to incise the stock from the radially outer surface of said stock to the surface of said work roll to form a ribbon, and regulating the distance between the furrow and the incision of said stock to control the width of the ribbon removed thereby.

5. A method of removing a ribbon of elastomeric stock from a rotating work roll comprising the steps of, forming a furrow through the stock on said rotating work roll, positioning a knife means having a cutting edge in said furrow and against said work roll such that the cutting edge of said knife means lies in a plane parallel to the axis of rotation of said work roll and is inclined at an angle of less than 90° with respect to a line parallel to said axis and located in said plane, incising a lead thread of stock from the side of said furrow at the radially outer surface of said stock with said cutting edge by lateral separation of said furrow and knife means, directing said lead thread away from said work roll, further separating said furrow and knife means to incise the stock from the radially outer surface of said stock to the surface of said work roll to form a ribbon, regulating the distance between the furrow and the incision of said stock to control the width of the ribbon removed thereby, and kicking the the ribbon off said work roll onto a conveyor means.

References Cited by the Examiner

UNITED STATES PATENTS

| | | | |
|---|---|---|---|
| 1,312,491 | 8/1919 | McClenathen | 156—259 |
| 2,086,616 | 7/1937 | Hansen et al. | 264—147 |
| 2,412,576 | 12/1946 | Giles | 156—259 |
| 2,973,549 | 3/1961 | Hurst. | |
| 3,101,509 | 8/1963 | Melim. | |

FOREIGN PATENTS 854,662  11/1960  Great Britain.

ROBERT F. WHITE, *Primary Examiner.*

S. A. HELLER, *Assistant Examiner.*